US009674715B2

(12) United States Patent
Ryan et al.

(10) Patent No.: US 9,674,715 B2
(45) Date of Patent: Jun. 6, 2017

(54) SYSTEM AND METHOD FOR MANAGING MULTI-PROCESS PRIORITY AND PARAMETER CONFLICT IN A SELF ORGANIZING NETWORK CONTROLLER

(71) Applicant: EDEN ROCK COMMUNICATIONS, LLC, Bothell, WA (US)

(72) Inventors: David James Ryan, Bothell, WA (US); Eamonn Gormley, Bothell, WA (US); Timothy Treptow, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 572 days.

(21) Appl. No.: 14/267,835

(22) Filed: May 1, 2014

(65) Prior Publication Data

US 2015/0052251 A1 Feb. 19, 2015

Related U.S. Application Data

(60) Provisional application No. 61/866,923, filed on Aug. 16, 2013.

(51) Int. Cl.
*H04W 24/02* (2009.01)
*H04L 12/24* (2006.01)

(52) U.S. Cl.
CPC ......... *H04W 24/02* (2013.01); *H04L 41/0816* (2013.01); *H04L 41/0886* (2013.01); *H04L 41/0866* (2013.01)

(58) Field of Classification Search
None
See application file for complete search history.

(56) References Cited

U.S. PATENT DOCUMENTS

| | | | |
|---|---|---|---|
| 2005/0193024 A1* | 9/2005 | Beyer | G06F 17/30286 |
| 2008/0046399 A1* | 2/2008 | Goodman | G06F 9/4443 |
| 2008/0130652 A1* | 6/2008 | Holt | H04L 45/00 |
| | | | 370/394 |
| 2008/0294598 A1* | 11/2008 | Imai | G06F 17/30168 |

(Continued)

FOREIGN PATENT DOCUMENTS

| | | |
|---|---|---|
| EP | 2 811 776 A1 | 12/2014 |
| WO | WO 2009/058154 A1 | 5/2009 |

(Continued)

OTHER PUBLICATIONS

International Search Report and Written Opinion for PCT/US2014/046891, filed Jul. 16, 2014.

(Continued)

*Primary Examiner* — Natisha Cox

(57) ABSTRACT

A method for managing multiple processes simultaneously in a communications network includes running a first application controlling a parameter of a network element, launching a second application, comparing a priority of the first application to a priority of the second application to determine a higher priority application and a lower priority application, determining a common parameter affected by the first application and the second application, writing data from the higher priority application to a current record, writing data from the lower priority application to a master record, and updating the common parameter based on the data written by the higher priority application to the current record.

20 Claims, 7 Drawing Sheets

(56) References Cited

U.S. PATENT DOCUMENTS

| | | | |
|---|---|---|---|
| 2009/0069018 A1* | 3/2009 | Babbar | H04L 67/322 |
| | | | 455/445 |
| 2009/0249326 A1* | 10/2009 | Ridley | G06F 8/61 |
| | | | 717/174 |
| 2009/0300017 A1* | 12/2009 | Tokusho | G06F 9/52 |
| 2010/0216467 A1 | 8/2010 | Ryan et al. | |
| 2011/0173625 A1* | 7/2011 | Arimilli | G06F 9/4843 |
| | | | 718/103 |
| 2012/0117478 A1* | 5/2012 | Vadde | G06F 9/54 |
| | | | 715/736 |

FOREIGN PATENT DOCUMENTS

| | | | | |
|---|---|---|---|---|
| WO | WO 2009058154 A1 * | 5/2009 | | G06F 9/5011 |
| WO | WO 2013/113266 A1 | 8/2013 | | |

OTHER PUBLICATIONS

Extended European Search Report for European Application No. 14836768.3 dated Mar. 6, 2017.

* cited by examiner

SYSTEM AND METHOD FOR MANAGING MULTI-PROCESS PRIORITY AND PARAMETER CONFLICT IN A SELF ORGANIZING NETWORK CONTROLLER

CROSS-REFERENCES TO RELATED APPLICATIONS

The present invention claims priority to U.S. Provisional Application No. 61/866,923, filed Aug. 16, 2013, which is incorporated by reference herein for all purposes.

BACKGROUND OF THE INVENTION

Wireless networks use a large number of individual base stations or cells to provide high capacity wireless services over large coverage areas such as market areas (e.g. cities), surrounding residential areas (e.g. suburbs, counties), highway corridors and rural areas. Continuous radio connectivity across these large coverage areas is accomplished via user mobility from one base station to others as the user traverses the network's operating area. Optimization of such networks is traditionally performed manually by network management personnel responsible for monitoring run time network performance and making changes to system configuration parameters in attempts to improve network performance and to respond to real time events such as cell outage, cell load imbalances, etc.

Recently technologies have been introduced to automate many of these traditionally manual network management tasks. These technologies, often collectively referred to as Self Organizing Network (SON) technologies, use automated processes carried out by hardware and software that continually monitor network performance and take corrective action in the case of particular network events. Examples include temporary compensation for cell outages, automated maintenance of wireless base station neighbor cell lists, autonomous network load balancing between highly loaded and lightly loaded neighboring cells, and many other automation use cases.

Practical SON systems must support multiple simultaneous SON automation software processes which may be referred to as SON Application Programs, or simply SON apps. In typical operation a SON system may be simultaneously executing a variety of independent SON apps. For example, a SON system may simultaneously execute an application monitoring and waiting to take corrective action for cell outage, an application monitoring and waiting to take action for load balancing, another application periodically updating neighbor list parameters, etc.

Running applications simultaneously may cause conflicts in a system. Multiple SON applications altering configuration parameters at the same network elements (e.g. wireless system base station cells) at the same time or in close succession to one another may lead to system instability problems and endless loops of parameter adjustments performed by multiple SON processes.

Attempts to maintain long term parameter defaults to the latest 'as optimized' configuration are complicated by the existence of multiple automated optimization modules operating across different time frames. Optimizations dealing with transient load imbalances and temporary compensation for out of service network cells operate in shorter time frames, while long term network optimization processes operate in longer time frames. Conflicts between multiple processes may cause system instability in a multi-process automation environment.

BRIEF SUMMARY OF THE INVENTION

This disclosure describes a system and methods for implementing a process priority and parameter setting conflict resolution scheme for use in an automated system responsible for optimization and management of communications networks.

In an embodiment, a method for managing applications a communications network includes running a first application controlling a parameter of a network element, launching a second application, comparing a priority of the first application to a priority of the second application to determine a higher priority application and a lower priority application, determining a common parameter affected by the first application and the second application, writing data from the higher priority application to a current record, writing data from the lower priority application to a master record, and updating the common parameter based on the data written by the higher priority application to the current record.

The method may further include locking the common parameter to the higher priority application, wherein locking the common parameter to the higher priority application includes preventing applications other than the higher priority application from updating the common parameter in the current record. In an embodiment, the common parameter from the higher priority application is unlocked after the higher priority application terminates. Data written to the master record may be used to change parameters in network elements after the lower priority application terminates.

The method may further include updating network element parameters from the master record when the higher priority application terminates. The application priority may be based on a duration of the application, the rate at which the application changes network parameters, or both. The duration may be a duration for which an application is expected to run. An operator console may be provided with a highest priority.

In an embodiment, the method includes creating entries in the current record when a common parameter affected by the first application and the second application is determined. The method may further include loading a third application with a priority lower than the lower priority application, determining a second parameter common the first, second, and third applications, comparing the priority of the third application to the priority of the first application and the priority of the second application, and writing data from the third application to the master record.

Although embodiments have been described with respect to a method, aspects of the present disclosure may also be embodied, for example, as a system or as a computer readable medium with computer executable instructions stored thereon.

DETAILED DESCRIPTION OF THE INVENTION

Figure 1:
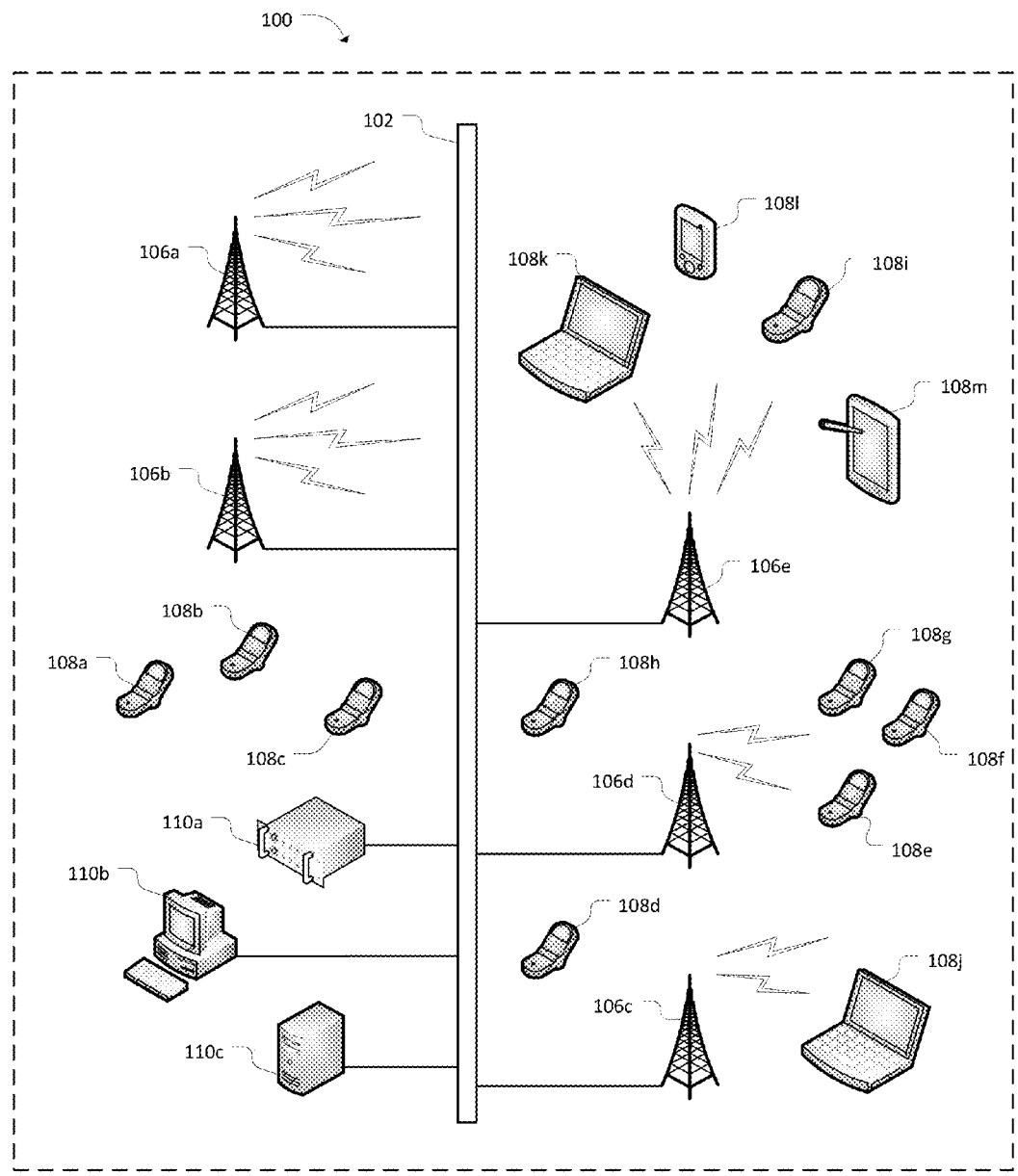
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates a networked communications system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked communications system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106*a-e*) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
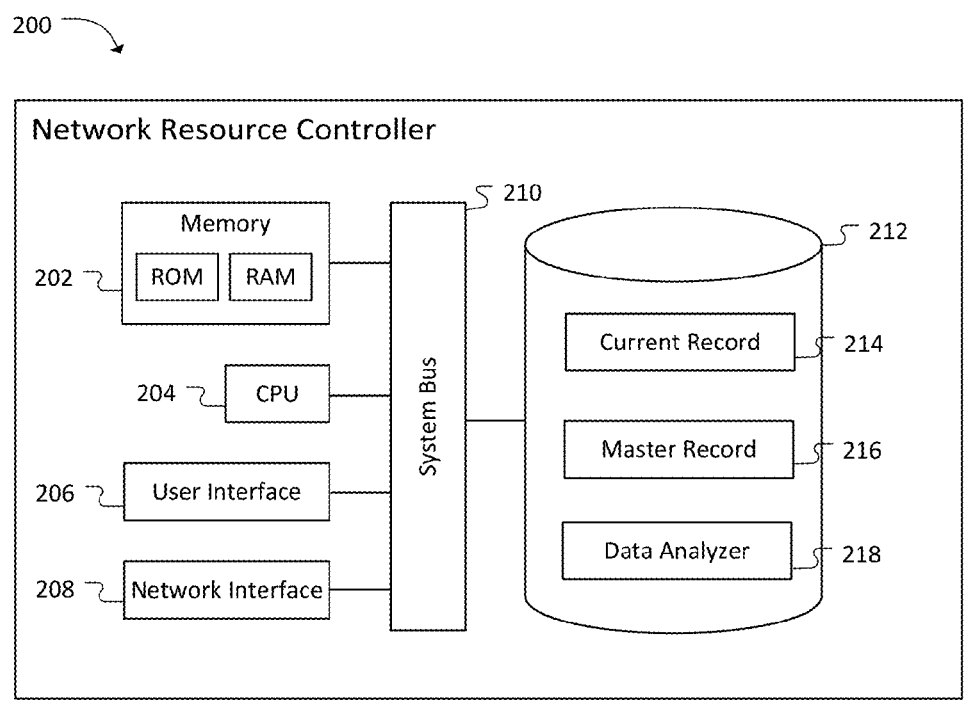
FIG. 2 illustrates a network resource controller according to an embodiment.

FIG. 2 illustrates a block diagram of an NRC 200 that may be representative of any of the network controller devices 110*a-c*. In an embodiment, one or more of the network controller devices 110*a-c* are SON controllers. The NRC 200 includes one or more processor devices including a central processing unit (CPU) 204. The CPU 204 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. Storage device 212 may a current record 214, one or more master record 216, and a data analyzer 218.

The NRC 200 may also include a user interface 206 that allows an administrator to interact with the NRC's software and hardware resources and to display the performance and operation of the networked computing system 100. In addition, the NRC 300 may include a network interface 206 for communicating with other components in the networked computer system, and a system bus 310 that facilitates data communications between the hardware resources of the NRC 200.

In addition to the network controller devices 110*a-c*, the NRC 200 may be used to implement other types of computer devices, such as an antenna controller, an RF planning engine, a core network element, a database system, or the like. Based on the functionality provided by an NRC, the storage device of such a computer serves as a repository for software and database thereto.

Figure 3:
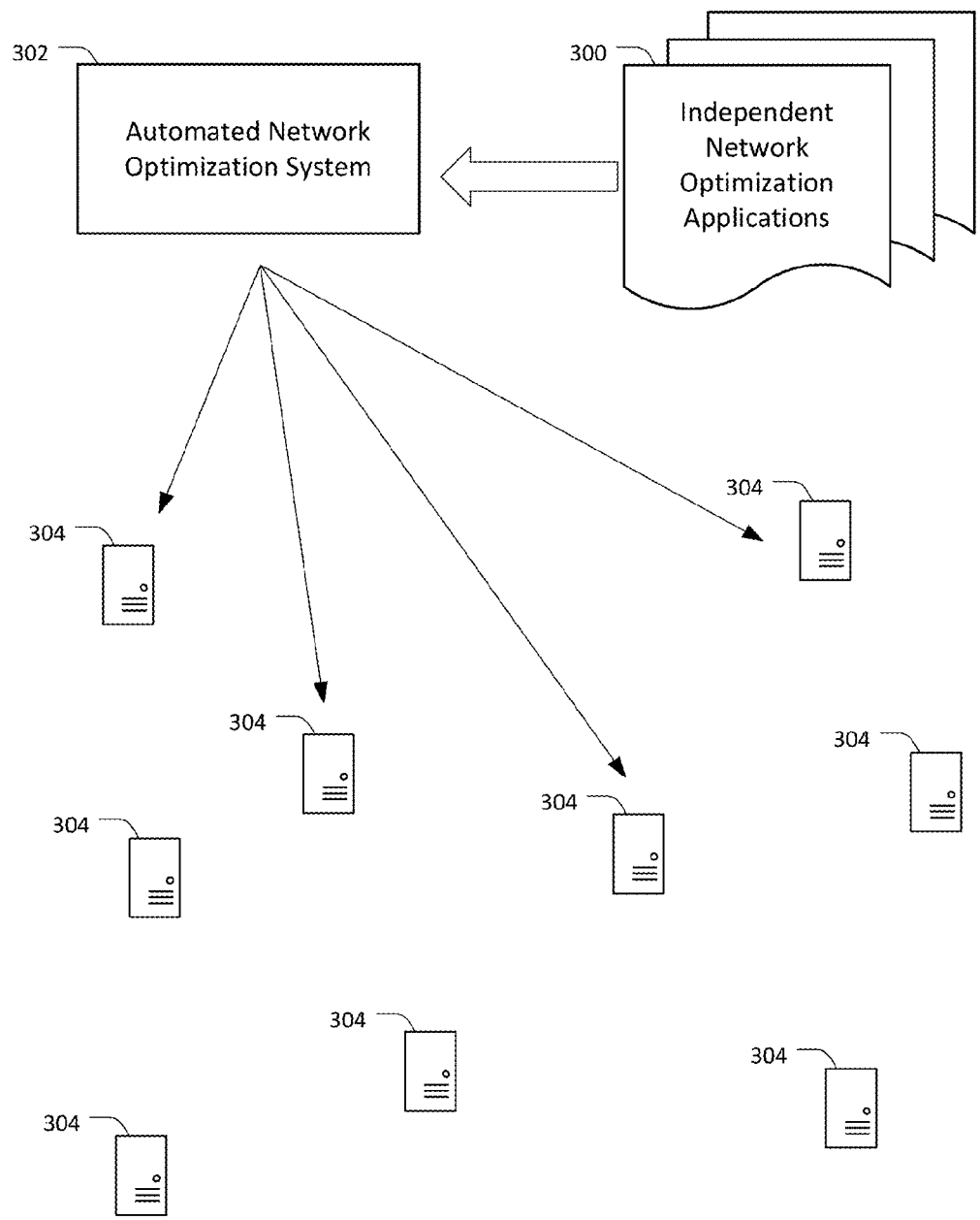
FIG. 3 illustrates a communication system.

FIG. 3 illustrates a system including a plurality of elements 304 that are managed by an automated network optimization system 302. In a wireless communications system such as a cellular communications system, the managed elements 304 may be base stations or components of base stations such as power amplifiers and remote electrical tilt (RET) mechanisms. In a wireless communications network, the elements may be part of a backhaul portion of the network. In a wired or wireless communications system, the network elements 304 may be various wired equipment such as routers, firewalls, wireless backhaul distribution systems, billing servers, data gateway devices, policy servers, media gateways, deep packet inspection probes, etc.

In a general sense, a network element is an entity that controls one or more parameter that is optimized to improve network performance by an optimization application 300. In an embodiment, network optimization system 302 includes a Self Organizing Network (SON) controller that automatically monitors and optimizes individual network device configuration parameters. A parameter of a network element 304 may be a variable associated with a characteristic of the element.

For example, when a network element 304 is an antenna at a base station of a cellular communications system, parameters of the antenna may include azimuth, beamwidth, transmit power and uptilt, etc. When the network element 304 is a router, parameters may include security protocols, prioritization schemes, and bandwidth devoted to certain activities. Many different combinations of elements and parameters are possible.

In an embodiment, the automated network optimization system 302 collects performance and operation data and updates parameters of the network elements 304 in response to specific network events, performance trends, or operator decisions. Parameters of the network elements 304 may be updated through time scheduled parameter updates, or in real time according to an operator input.

Network optimization system 302 supports multiple independent network optimization applications 300. The term "application" may be alternately referred to as a module. Each of the applications 300 may support long term or transient network optimizations in response to defined events such as predetermined alarm conditions or performance metric trends.

For example, when an alarm is received at system 302 indicating a cell outage, the system may run one or more application 300 to restore coverage. An application 300 may adjust the parameter such as a pointing direction of an element 304 such as a cellular antenna.

An example of a long term optimization application 300 is antenna tilt optimization, which may run continuously for an indefinite period in a network. A tilt optimization process controls a tilt angle parameter of antenna network elements 304. However, a tilt optimization process may measure performance metrics of a plurality of cells in order to determine an optimized downtilt value, so changes to the downtilt of a particular antenna may be relatively minor, and may not occur for extended periods of time.

Figure 4A:
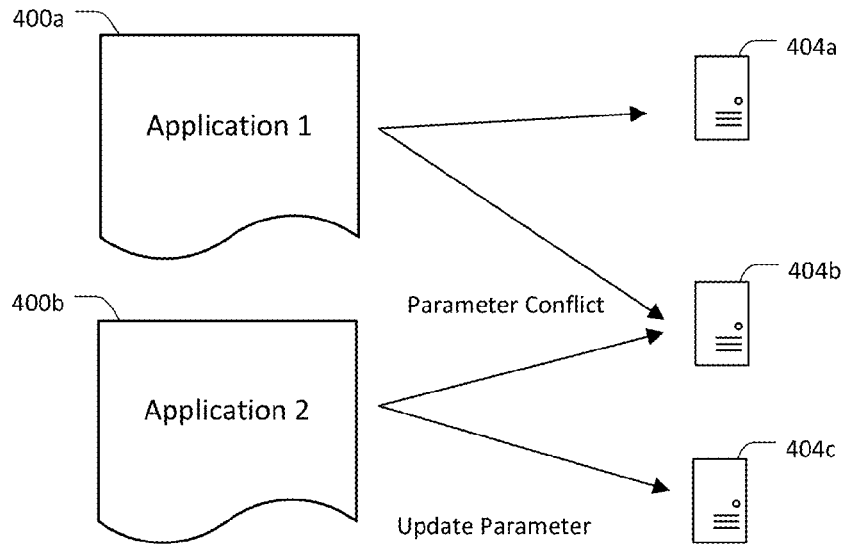
FIGS. 4A and 4B illustrate conflict scenarios.
Figure 4B:
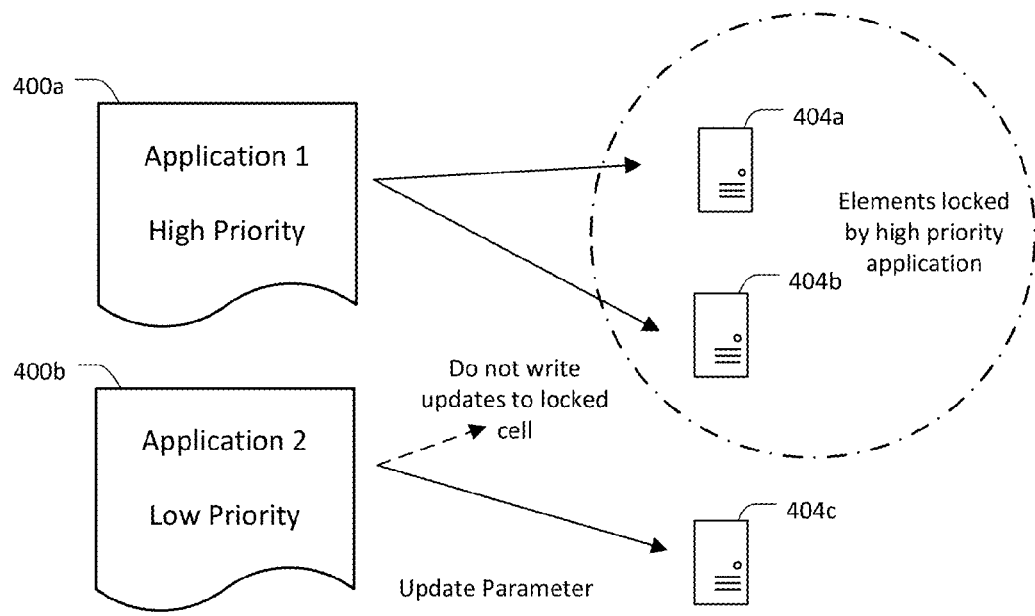

FIGS. 4A and 4B illustrate application conflict scenarios. A first application 400*a* controls parameters of network elements 404*a* and 404*b*, while second application 400*b* controls parameters of network elements 404*b* and 404*c*. In the embodiments of FIG. 4, first and second applications 400*a* and 400*b* each control the same parameters of network elements 404.

As seen in FIG. 4A, a conflict may arise when the first and second applications 400*a* and 400*b* are run simultaneously. For example, the first application 400*a* may be a cell outage compensation application, and the second application 400*b* may be a tilt optimization application. Meanwhile, element 404*b* may be a cellular base station, and a common parameter controlled by applications 400*a* and 400*b* is a downtilt of an antenna for a particular set of frequencies. While the first application 400*a* may instruct the base station to increase the downtilt to compensate for a cell outage, the second application may simultaneously instruct the base station to decrease the downtilt to optimize performance over an extended network area.

FIG. 4B shows an example of handling a conflict according to an embodiment. The first and second applications 400a and 400b are classified according to priority levels. A cell outage can be a critical event in a network resulting in loss of coverage for a plurality of users. On the other hand, while tilt optimization can have a significant effect on network performance, the effects of tilt adjustments generally are less substantial than a cell outage.

In addition, a cell outage compensation application may run for a relatively short duration until service is restored, while a downtilt optimization application may run indefinitely. Accordingly, first application 400a for cell outage compensation has a higher priority than second application 400b for downtilt optimization.

When an application conflict occurs, parameters of elements that are controlled by high priority first application 400a are locked to that application. When more than two application priorities are implicated in a conflict, the element parameters controlled by the application with the highest priority may be locked to that application. In this scenario, second application 400b cannot update a parameter locked to first application 400a while it is locked by the higher priority application.

Figure 5:
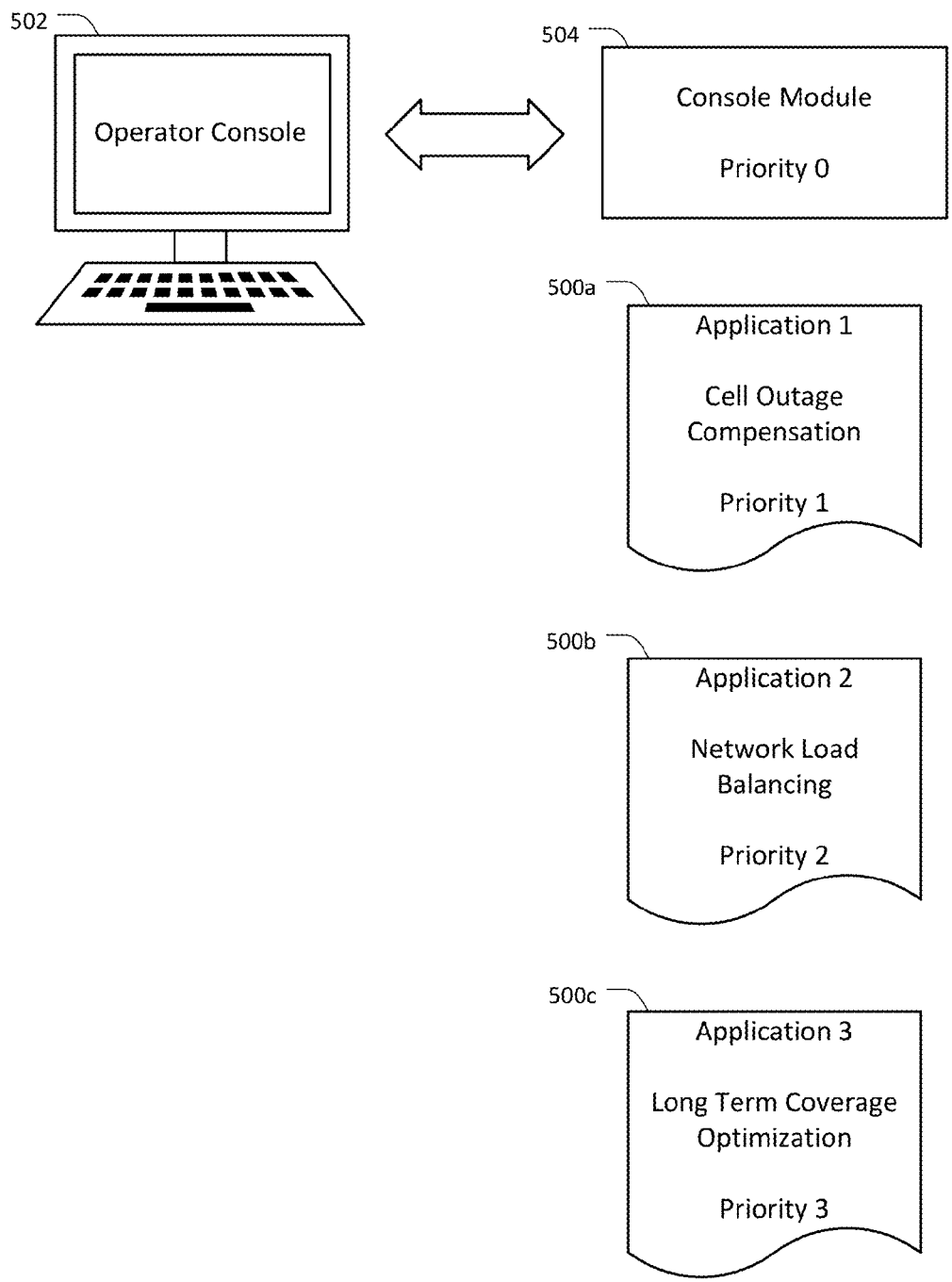
FIG. 5 illustrates various applications in a system.

FIG. 5 illustrates application priorities according to an embodiment. FIG. 5 shows three applications 500a, 500b, and 500c with different priorities. In this embodiment, highest priority is given to modules with the lowest numerical priority index. Thus, first application 500a has a higher priority (1) than second application 500b (2), which in turn has a higher priority than third application 500c (3).

In an embodiment, when the three applications 500a, b, and c are running simultaneously and attempting to control the same parameters of a network element, the module with the highest priority can lock out other lower priority modules such that they cannot make parameter changes to the specific network elements. Conversely, if a module of lower priority is actively making changes and holding a specific network element in a locked state, that lock state could be overridden by modules with a higher priority ranking.

The priorities of applications 500a-c in FIG. 5 correspond to the functions that the applications perform. Cell outage compensation application 500a makes changes in response to a critical event that can potentially result in a total loss of coverage to multiple users, and in many cases may only operate for a relatively short period of time until the cell is brought back online, for example in a routine maintenance procedure. An unbalanced wireless load is generally less critical than a cell outage, so the network and load balancing application 500b has a lower priority ranking than cell outage compensation application 500a.

Long term coverage optimization application 500c has a priority that is lower than load balancing application 500b. In an embodiment, load balancing application 500b makes significant and ongoing changes to network elements multiple times per day in response to dynamic conditions, while coverage optimization application 500c makes incremental changes at relatively long term intervals. Factors that may influence prioritization include criticality of an application, current operational needs and network operational policies, and the duration of the application.

FIG. 5 also shows an operator console 502 which controls a console module 504. In a system which includes an operator console 502, the operator console module 504 may have a priority ranking (0) that is higher than all other applications. In such an embodiment, operator console 502 can override all currently running applications so that an operator can manually control network elements regardless of which applications are currently running. In this way, network engineers overseeing automated network optimization processes have access and control and take priority over automated process applications.

Figure 6:
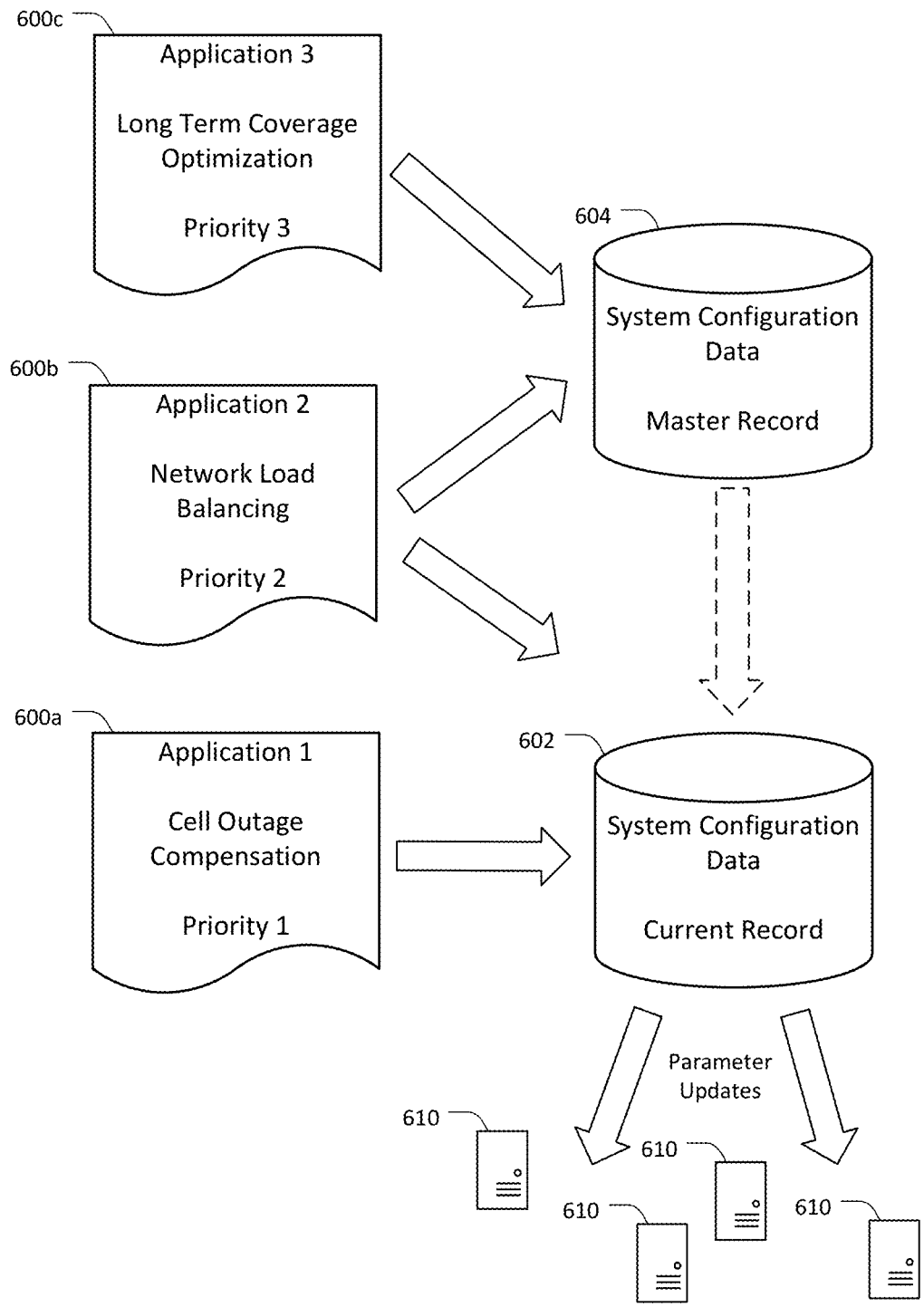
FIG. 6 illustrates three concurrent applications according to an embodiment.

With respect to FIG. 6, in an embodiment in which priorities are assigned according to a duration of application processes, longer term network parameter settings which may serve as default parameter settings for the purpose of establishing system restore points and for maintaining a nonvolatile record of an optimized network are stored in a master record database 604. An application 600 whose outputs are intended to be long term changes to overall network configuration write their parameter updates to this master record database 604.

A higher priority application 600 whose outputs are intended to be temporary changes to the overall network configuration may lock access to those parameters and write those parameter change outputs to the current record database 602. These parameter changes are then automatically pushed to the targeted network elements 610. Examples of temporary changes to network element parameters include altering transmit power or antennal tilt at specific network cells to provide temporary wireless network coverage in situations where neighboring wireless base stations are non-operational due to maintenance activities or failures. Other examples include temporary parameter adjustments related to temporary load balancing between multiple network cells and alterations to normal system configuration parameters in response to planned or unplanned events such as sporting events at stadiums, conventions or other time limited events during which system parameters may be temporarily set to an altered state.

Applications 600 whose outputs are intended to be long term may write those outputs to the master record database 604 as described above, and if there are no higher priority applications locking the network elements targeted by the application initiating the long term changes those changes will be written to the current record database 602 and then automatically pushed to the targeted network elements 610. In an embodiment in which an application 600 making long term network changes targets one or more network elements 610 (e.g. wireless base stations) that are currently locked by a higher priority application that has made temporary changes to the current record database, the changes may be held in the master record database 604 until the targeted network elements 610 are released from their lock state. Accordingly, in an embodiment, highest priority applications 600a may write to current record 602, while lower priority applications write directly to master record 604.

FIG. 6 illustrates a process of using separate databases to manage an application conflict according to an embodiment. A first application 600a has a higher priority than second application 600b, and both applications attempt to change the same parameters of network elements 610. First application 600a writes data to current record 602, which is a database that retains a copy of the current configuration of parameters of network elements 610. Meanwhile, second application 600b writes data to first master record 604, which is a database that holds long term default parameter settings for network elements, etc. When first application 600a terminates and associated configuration parameters are unlocked, data is written from the master record 604 to the current record 602.

In an embodiment in which highest priority application 600a and second priority application 600b are running, if highest priority application 600a has a lock on parameters of the current record 602, then only application 600a can make chances to those parameters of the current record. If application 600b has the lock and has made changes to those parameters of the current record 602 and application 600a later obtains the lock from application 600b because it has a higher priority than application 600b, then application 600a can make changes to the current record. In an embodiment, the data in the current record 602 that has been changed by application 600b is left the way that it currently is set and application 600a uses that configuration as its starting point. In another embodiment, the data in the current record 602 is reverted to the data in the master record 604 before application 600a makes any SON decisions. Such a policy may be implemented differently on a parameter by parameter basis. Furthermore, applications making temporary changes may also have local storage so that when they are done making temporary changes, they can revert aspects of the current record 602 back to a state from when the application locked the parameter.

Master record 604 may retain settings for all managed elements within the network that are managed by one or more applications within a communications system. For example, in one embodiment, the master record 604 stores configuration parameters for all elements in a network, or configuration parameters for every element that is managed by an application that is currently running in a system. In such an embodiment, the master record 604 may serve as the default record for network parameters, and a current record 602 is created when an application with a different priority that attempts to control same parameters as a currently running application is launched. A current record 602 may be created by writing parameter data form the master record 604.

In another embodiment, a master record 602 is created when a higher priority application locks elements that a lower application is attempting to control. In such an embodiment, a master record 604 may be created by copying parameter configuration data for parameters that are controlled by the lower priority application to a master record, and continuing to update that master record for the duration that the lock is in place. When the lock is removed, parameter configuration data is written from the master record to the current record 602, and parameters of elements 610 are updated based on the current record.

In an embodiment, each time an application whose output is intended to be a long-term changes to network configuration is launched, a check is made to determine whether configuration parameters are currently locked by an application with a higher priority. In an embodiment, the check may be made by a framework in which the application is running. When parameters are not locked by a higher priority application, the application locks the configuration parameters that it controls to itself, and parameter updates may be written to the master record 604 and automatically pushed to the current record 602. When parameters are locked by a higher priority application, parameter updates are written to the master record 604 and are pushed to the current record when the parameters are no longer locked by a higher priority application.

FIG. 6 shows an embodiment in which three applications 600a-c with different priorities are running simultaneously. First application 600a has a highest priority, and writes data to a current record 602, which controls a current state of affected network elements. Parameters of network elements 610 which are controlled by the first application 600a are locked to that application so that other lower priority applications cannot update the parameters.

A second application 600b, whose output is intended to be long-term changes to network configuration and which has a lower priority than first application 600a but controls the same network elements, writes data to master record 604. As application 600b updates parameters, it writes parameter data to the master record 604. If a parameter that is updated by second application 600b is not locked by higher priority application 600a, updates may be pushed from the master record 604 to the current record 602, and if a parameter is locked then the master record 604 is updated but parameters are not pushed to the current record.

Similarly, a third application 600c may write data to master record 604. If processes 600a and 600b both terminate, data associated with the third application 600c may be pushed from the master record 604 to current record 602. In an embodiment in which three applications 600a, 600b, and 600c all attempt to change the same parameter, highest priority application 600a may change the parameter in the current record, second priority application 600b may change the parameter in a data file associated with the application, and third priority application may change the parameter in the master record. Subsequently, when application 600a terminates, parameters are pushed from the data file associated with application 600b to the current record while application 600c continues to write to the master record. However, this is merely an example, and it will be recognized that other particular methods for handling priorities of more than two applications are within the scope of this disclosure. While FIG. 6 shows an embodiment running three applications, in other embodiments, four or more simultaneous applications are possible.

Figure 7:
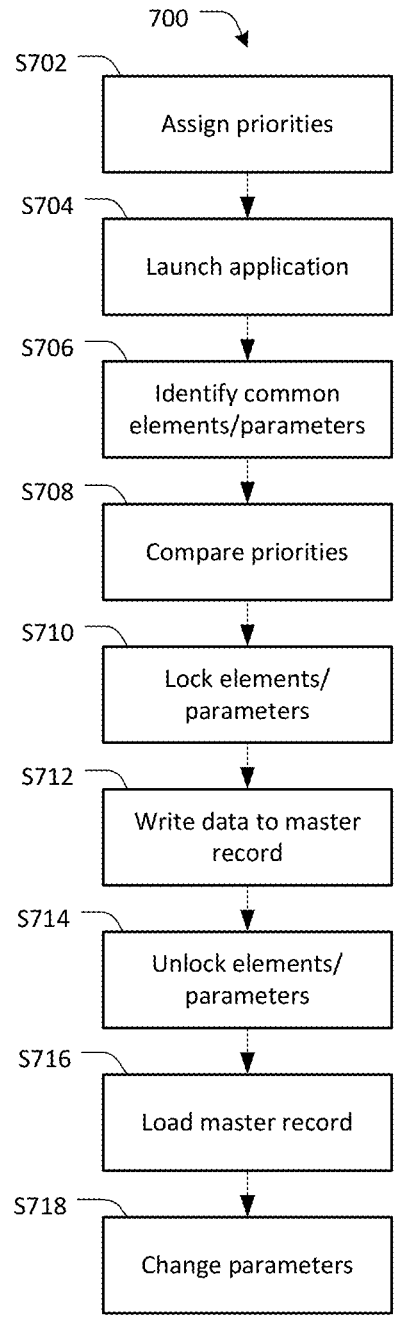
FIG. 7 illustrates a process of managing multiple applications according to an embodiment.

FIG. 7 illustrates a process 700 of managing multiple applications in a communications system according to an embodiment.

At S702, priorities are assigned to applications. As discussed above, a factor which may be used to determine priority is a duration of the application, where shorter duration applications have higher priorities. The duration may be the total duration for which the application is scheduled or expected to run, or a duration of one or more component of the application such as a data collection interval. Another factor that can be used to set the priorities is the fastest rate at which an application makes changes. Longer term optimizations make changes at a slower rate (e.g., once per day) and may be assigned a lower priority, while applications that may make changes at a faster rate (e.g., load balancing) may be assigned a higher priority.

Another factor that may be used is the criticality of the application. Criticality may be determined, for example, based on the expected impact that the application will have on a system. The impact may be measured in terms of overall system performance or in terms of a magnitude of impacts that the application will have on a set of users. For example, an application that restores lost service to users may be determined to be more critical than an application that increases data throughput for users, and an application that results in significant performance increases may more critical than an application that results in minor performance increases.

Another factor that may be considered in assigning priorities S702 is the number of network elements that are affected by an application. While some applications such as long term optimizations are run across a large number of elements in a large area, other applications are tailored to localized phenomena. Examples of applications that may be limited to a relatively small number of elements include localized interference mitigation and emergency cell outage compensation applications. In an embodiment, highly localized applications, or applications which affect a relatively small number of network elements may be assigned higher priority values than applications that affect a large number of elements.

Priorities may be assigned manually or automatically. In a manual embodiment, network management personnel may set priority rank values for each application in a network. In an automatic embodiment, scores may be calculated based on one or more of the factors identified above, or other factors, and a ranking is assigned based on the score.

In an embodiment, a small number of priorities such as two, three, or five are assigned. However, the number of priorities may extend to a larger number. For example, each application in a system may be assigned its own priority so that no two applications share a priority. In an embodiment that includes an operations console such as operations console 502 of FIG. 5, the operations console may be assigned a highest priority.

An application is launched at S704. If no other applications are running at the same time, the application may write directly to a current record by default. In another embodiment, the application may write parameter updates to the master record which are automatically pushed to a current record.

When one or more application is running in a system, elements and/or parameters that are controlled by both the newly launched application and a currently running application are identified at S706. In one embodiment, S706 only includes identifying common parameters. In another embodiment, S706 identifies common elements. An element may a general entity such as a base station, a more specific entity such as an antenna of the base station, or a still more specific entity such as a particular amplifier in the antenna. Identifying common elements and/or parameters may include generating lists of elements and/or parameters that are controlled by each application and comparing the lists.

At S708, the priority of a newly launched application is compared with a priority of every other application that was determined to be controlling same parameters and/or elements as the newly launched application. In an embodiment, when the newly launched application has the same priority as a currently running application and controls the same parameters and/or elements, an alarm is triggered and an operator is alerted to resolve the priority conflict. At this point, the operator may designate which application will write to a master record and which application will write to a current record with respect to the priority conflict. The operator may be provided with an opportunity to temporarily or permanently change the priority of the applications.

At S710, elements and/or parameters of elements are locked to a highest priority application. When an element or parameter is locked to an application, other optimization applications are prevented from making changes to the element or parameter. A lock may be established by, for example, by modifying permissions for writing to the element or parameter. One or more element and/or parameter may be simultaneously locked to an application.

At S712, a lower priority application, whose output may be long-term changes to network configuration, writes data to the master record while a current record is locked to a higher priority cell application.

Parameters and/or elements are unlocked from the higher priority application at S714. The parameters and/or elements may be unlocked when the higher priority application is automatically or manually terminated. When parameters and/or elements are unlocked, they may be modified by one or more application other than the application to which they were previously locked.

At S716, data from the master record is loaded to the current record, and network parameters are updated based on the new current record data at S718. Some or all data from the master record may be copied to the current record, and network parameters are updated based on the changes to the current record.

In an embodiment, step S716 is not performed. In such an embodiment, when a highest priority application terminates and the parameters and/or elements are unlocked, a master record of a lower priority application is not written to the current record. Instead, the master record may be rejected and the current record may be retained. This may occur when a situation that is normally short-term, such as a cell outage, becomes long term.

For example, a cell outage compensation application that normally compensates for cell outage durations of a few hours may launch to compensate for a catastrophic event that causes the cell to be offline for an extended period of time such as a month. In such an embodiment, the compensation application may be terminated to allow other applications to control associated parameters. However, when the higher priority application terminates, loading data from a master record may return an affected portion of a network to a state before the outage was compensated for. Accordingly, the current record may be unaltered by master records of lower priority applications. Instead, master records of lower priority applications may be deleted or updated based on the current record.

While steps of process 700 are illustrated in FIG. 7 as occurring in a particular order, embodiments are not so limited. Persons of skill in the art will recognize that aspects of process 700 may be performed in an order other than that shown in FIG. 7, and that not all aspects of the process are performed in some embodiments.

What is claimed is:

1. A method for managing applications a communications network, the method comprising:
running a first application controlling a parameter of a network element;
launching a second application;
comparing a priority of the first application to a priority of the second application to determine a higher priority application and a lower priority application;
determining a common parameter affected by the first application and the second application;
writing data from the higher priority application to a current record;
writing data from the lower priority application to a master record; and
updating the common parameter based on the data written by the higher priority application to the current record.

2. The method of claim 1, further comprising:
locking the common parameter to the higher priority application,
wherein locking the common parameter to the higher priority application includes preventing applications other than the higher priority application from updating the common parameter in the current record.

3. The method of claim 2, further comprising:
unlocking the common parameter from the higher priority application after the higher priority application terminates.

4. The method of claim 3, wherein the data written to the master record is used to change parameters in network elements after the lower priority application terminates.

5. The method of claim 1, further comprising:
updating network element parameters from the master record when the higher priority application terminates.

6. The method of claim 1, wherein an application priority is based on a duration of the application.

7. The method of claim 6, wherein the duration is a rate at which the application changes network parameters.

8. The method of claim 6, wherein the duration is a duration for which an application is expected to run.

9. The method of claim 1, further comprising:
providing an operator console with a highest priority.

10. The method of claim 1, further comprising:
creating entries in the current record when a common parameter affected by the first application and the second application is determined.

11. The method of claim 1, further comprising:
loading a third application with a priority lower than the lower priority application;
determining a second parameter common the first, second, and third applications;
comparing the priority of the third application to the priority of the first application and the priority of the second application; and
writing data from the third application to the master record.

12. A communications system in a communication network, the system comprising:
a processor;
a memory; and
a non-transitory computer readable medium with computer executable instructions stored thereon which, when executed by the processor, perform the following method:
running a first application controlling a parameter of a network element;
launching a second application;
comparing a priority of the first application to a priority of the second application to determine a higher priority application and a lower priority application;
determining a common parameter affected by the first application and the second application;
writing data from the higher priority application to a current record;
writing data from the lower priority application to a master record; and
updating the common parameter based on the data written by the higher priority application to the current record.

13. The system of claim 12, wherein the method further comprises:
locking the common parameter to the higher priority application, and
wherein locking the common parameter to the higher priority application includes preventing applications other than the higher priority application from updating the common parameter in the current record.

14. The system of claim 13, wherein the method further comprises:
unlocking the common parameter from the higher priority application after the higher priority application terminates; and
updating network element parameters from the master record when the higher priority application terminates.

15. The system of claim 13, wherein the duration is a rate at which the application changes network parameters, and
wherein the duration is a duration for which an application is expected to run.

16. The system of claim 13, wherein the data written to the master record is used to change parameters in network elements after the lower priority application terminates.

17. The system of claim 13, wherein the method further comprises:
providing an operator console with a highest priority.

18. The system of claim 13, wherein the method further comprises:
creating entries in the current record when a common parameter affected by the first application and the second application is determined.

19. The system of claim 13, wherein the method further comprises:
loading a third application with a priority lower than the lower priority application;
determining a second parameter common the first, second, and third applications;
comparing the priority of the third application to the priority of the first application and the priority of the second application; and
writing data from the third application to the master record.

20. A non-transitory computer readable medium with computer implemented instructions stored thereon which, when executed by a processor, perform the following method:
running a first application controlling a parameter of a network element;
launching a second application;
comparing a priority of the first application to a priority of the second application to determine a higher priority application and a lower priority application;
determining a common parameter affected by the first application and the second application;
writing data from the higher priority application to a current record;
writing data from the lower priority application to a master record; and
updating the common parameter based on the data written by the higher priority application to the current record.

* * * * *